Figure 1:
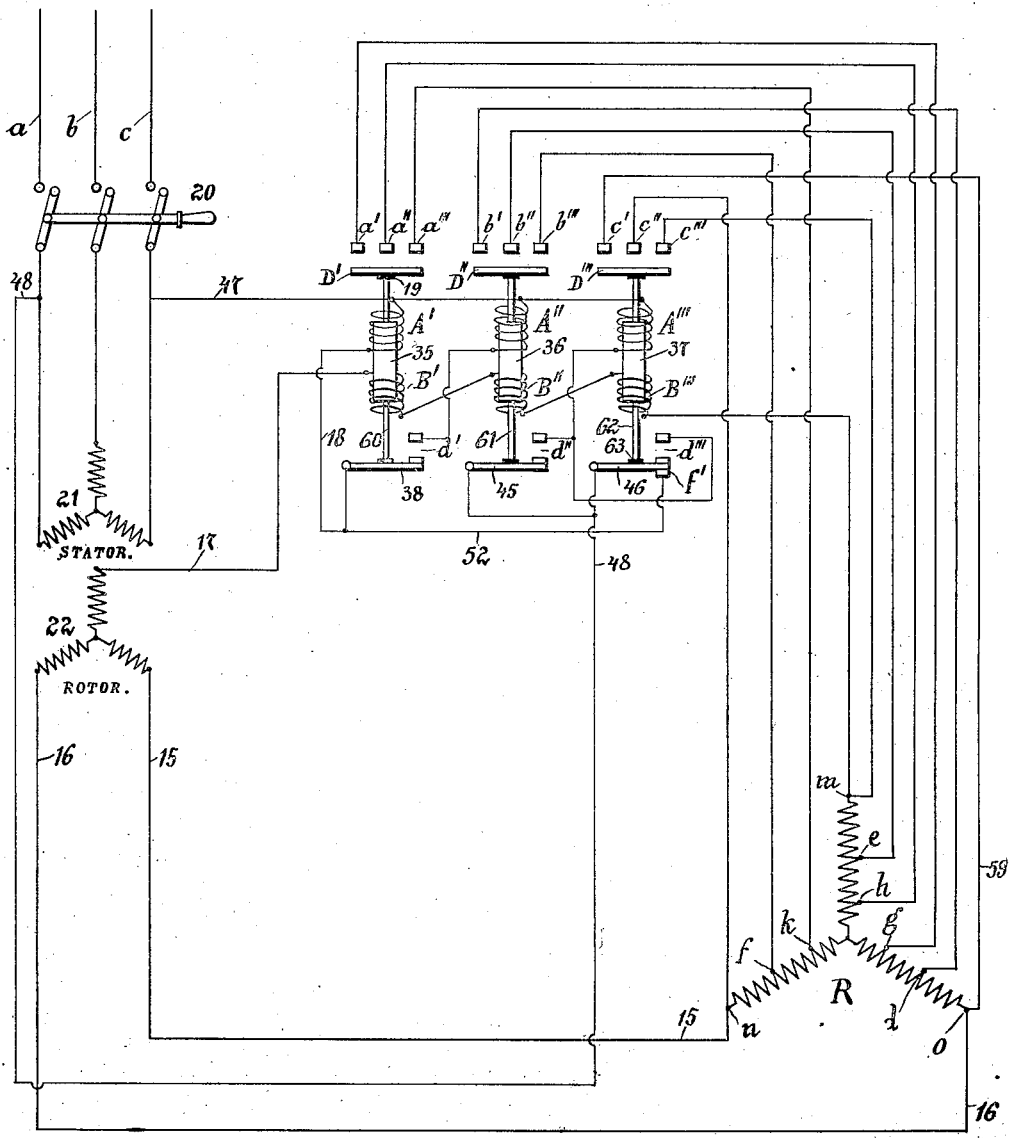

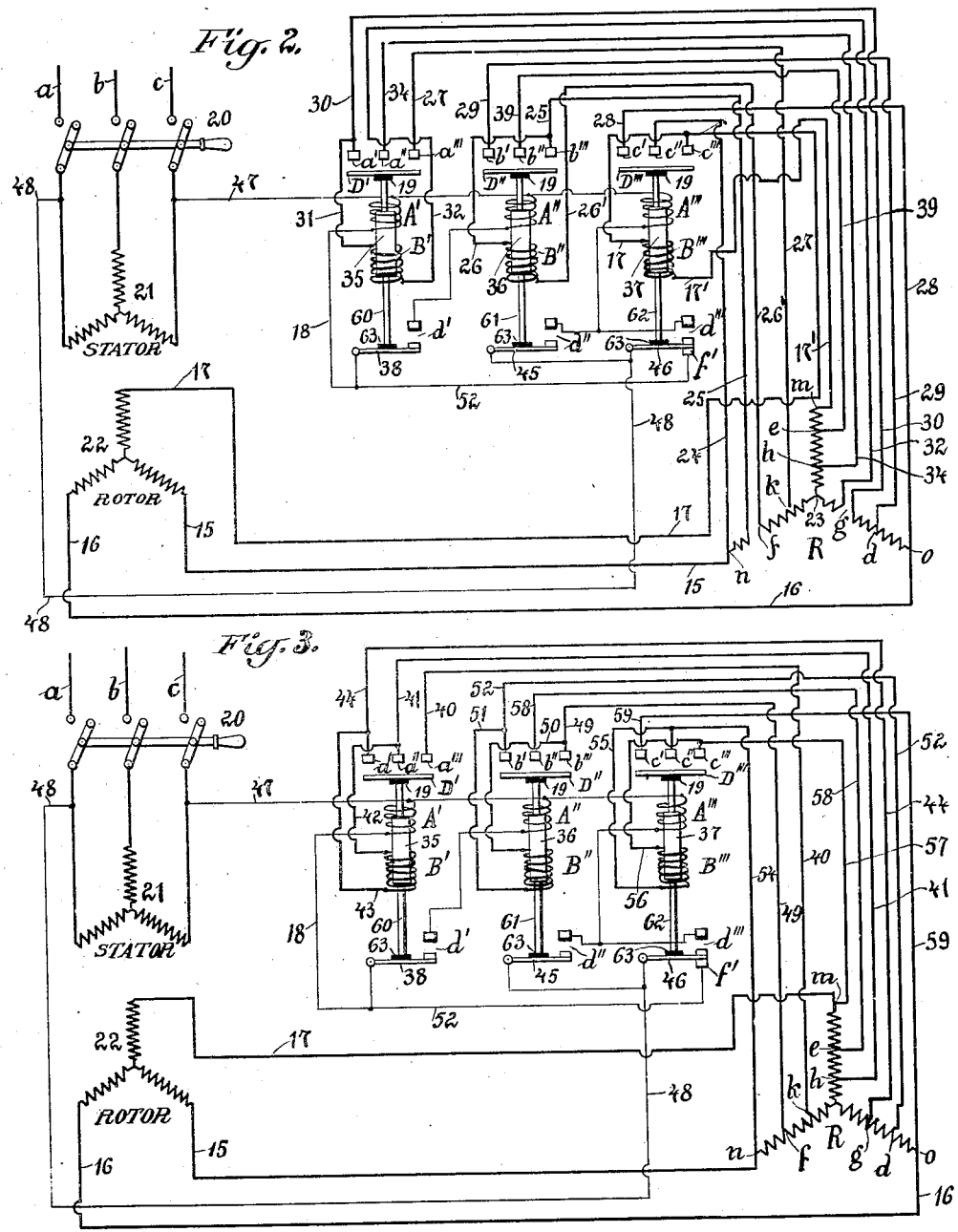

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

ALTERNATING-CURRENT-MOTOR CONTROL.

1,102,521.   Specification of Letters Patent.   Patented July 7, 1914.

Application filed December 18, 1905. Serial No. 292,122.

*To all whom it may concern:*

Be it known that I, DAVID L. LINDQUIST, a subject of the King of Sweden, residing in the city of Yonkers, in the county of Westchester and State of New York, have invented a new and useful Improvement in Alternating - Current - Motor Control, of which the following is a specification.

My invention relates to means for controlling alternating current motors which are adapted to be operated by single-phase or polyphase currents, and comprises subject-matter disclosed in my patent for controlling device for alternating current motors, No. 980,302, January 3, 1911.

One of the objects of my invention is the provision of means for controlling alternating current motors independently of predetermined voltages on the lines or mains within certain limits, from which mains the motor is arranged to be supplied with current.

Another object of my invention is the provision of starting means for electric motors, comprising coils which act in opposition to each other and some of which are in series with each other or in circuit with portions of the starting resistance.

Other objects of the invention will appear hereinafter, the novel combinations of elements being pointed out in claims.

Referring to the accompanying drawings, Figure 1 represents diagrammatically my invention applied to a three-phase induction motor; and Figs. 2 and 3 represent modifications of the apparatus illustrated in Fig. 1.

In all of the figures, $a$, $b$, $c$ represent the mains which may be connected by means of a manual switch 20 with the primary winding or stator winding 21 which is in inductive relation with the rotor winding 22. Although I have herein shown a three-phase induction motor with star-connected windings, I wish it to be understood that I do so merely by way of illustration, as any other type of induction motor may be used if desired. For instance, the primary and secondary windings may be delta-connected or a three-wire two-phase system may be employed.

R designates the starting resistance which is shown similar to the secondary or rotor winding of the motor but may also be changed when the windings of the motor are changed. To the terminals $g$, $h$ and $k$ are connected, respectively, fixed contacts $a'$, $a''$, $a'''$, while to the terminals $d$, $e$ and $f$ are connected the fixed contacts $b'$, $b''$, $b'''$ and to the terminals $o$, $m$ and $n$ are connected the fixed contacts $c'$, $c''$, $c'''$. Under the sets of fixed contacts mentioned are suitably mounted the movable bridging pieces or contact-making plates $D'$, $D''$ and $D'''$ which are respectively rigidly secured on the upper ends of the plungers or cores 35, 36 and 37 but insulated therefrom, as for example, by the insulation at 19. Extending from the lower ends of these cores are the rods 60, 61 and 62 which may be secured to the contact levers 38, 45 and 46, respectively, but insulated therefrom by the insulation 63. Preferably, however, these contact levers are in the form of springs, and the rods 60, 61 and 62 normally resting on said springs, but not secured thereto, so as to hold the contacts $d'$, $d''$ and $d'''$ normally in open position and the contacts $f'$ in closed position.

Associated with the cores 35, 36 and 37 are the solenoids $A'$, $A''$ and $A'''$ which when excited act to draw upwardly their respective cores. Also associated with these cores are additional solenoids $B'$, $B''$ and $B'''$ which when excited will act to draw their respective cores in a downward direction against the action of the solenoids $A'$, $A''$ and $A'''$. It will be noticed that the solenoids $A'$, $A''$ and $A'''$ are connected in multiple to each other and to one of the primary mains by means of the wire 47. The solenoids $B'$, $B''$ and $B'''$ are connected in series with each other in any one of the secondary phases, in this instance that designated 17, between the rotor winding 22 and the terminal $m$ of the starting resistance R.

When the main line switch 20 is closed, a single-phase circuit is opened from the main $c$ through the coil $A'$, wires 18 and 52, contacts $f'$, lever 46, and wire 48, to either the main $b$ or main $a$. In this instance, I have shown wire 48 connected to the main $a$. Current will also flow through the primary or stator winding of the motor and current will be induced in the secondary or rotor winding, the secondary voltage being at this time at its maximum. The current which will consequently flow through the phase 17, including the coils $B'$, $B''$ and $B'''$ will be in its maximum and therefore hold the cores 35, 36 and 37 in their lowermost position and against any tendency of the coils A', A", and A''' to draw the cores in the opposite direction. So long as the voltage of the primary mains remains substantially constant, the current through the coil A' and consequently the strength or pulling force on the core 35 will remain constant. But as the motor speeds up the secondary voltage drops, causing less and less current to flow through the coils B', B", B''' until finally the coil A' overcomes coil B' and moves the bridge piece D' into engagement with the fixed contacts $a'$, $a''$, $a'''$, thus cutting out the central portion of the starting resistance R. If the part 38 is a spring, contact $d'$ would be closed by its action when released. This will have the effect of closing a single-phase circuit through the coil A" in parallel with the coil A'. As the motor increases further in speed coil A" will overcome coil B" and move the core 36 upwardly, so that the bridge piece D" will connect the fixed contacts $b'$, $b''$, $b'''$ and thus short-circuit the intermediate portion of the starting resistance R between the terminals $d$, $e$ and $f$. Furthermore, the closure of the contacts $d''$ will be effected, therefore the coil A''' will be excited with single-phase current. The three coils A', A", A''' are now connected in parallel with each other. When the coil A''' overcomes the coil B''', the contacts $d'''$ are closed and the contacts $f'$ opened. This will have the effect of short-circuiting the sections of the resistance R between the terminals $o$, $m$ and $n$, when the motor can run up to full speed. Furthermore, by the opening of the contacts $f'$ the current through the coils A' and A" is interrupted and another path for the current through the coil A''' is established through the contacts $d'''$ and spring 46. Upon the cutting off of the current from the coils A', A", the coils B' and B" will act to move the cores 35 and 36 to their original positions, thus opening the contacts $d'$, $d''$ and also separating the bridge pieces D', D" from engagement with the fixed contacts above them. The core 37, however, is held in its uppermost position and therefore the starting resistance R kept short-circuited, contacts $d'''$ closed, and contacts $f'$ opened. Since only one switch is held closed in order to maintain the motor at full speed, the current consumption of the controller is materially reduced. Furthermore, when the last switch in the series is opened, the entire starting resistance R will be inserted in the rotor circuit to slow down the motor, and in order to start or again operate the motor at full speed, the electromagnetic starting switches must be operated consecutively as explained before.

The arrangement described is for the purpose not only of simplifying the wiring, but to automatically control the starting of the motor and maintain the same at substantially full speed independently of the voltage in the primary within certain limits; that is to say, when the circuits to the motor are closed to a source of supply of alternating current, the relation between the currents passing through the coils is constant, so that if a drop of voltage should occur in the primary mains, the operativeness of the switches to properly start the motor would not be impaired. This constant relation of voltages also holds true while the motor is running, so that should the main line voltage drop, the switches would still be operative by being held in closed position, and therefore not interfering with the running of the motor. It may be explained, furthermore, that by this constant relation of voltages, my apparatus may be used with mains operated within a wide range of voltages.

Referring now to Fig. 2, it will be seen that the apparatus is somewhat similar, but instead of connecting the coils B', B", B''' in series with each other as in Fig. 1, I have connected them in series with portions of the sectional starting resistance R, so that when the second switch operates it not only short-circuits a portion of the starting resistance but also the coil B', and when the third switch operates B" is also short-circuited.

The operation of the apparatus shown in Fig. 2 is as follows: Upon closing the main line switch 20, a single-phase circuit is established from main $c$ through wire 47, coil A', wires 18 and 52, contacts $f'$, spring 46, and wire 48 to main $a$. The motor will now start, and when the same reaches a predetermined speed, its secondary voltage and consequently the current through the coil B' will be decreased to such an extent that the coil A' overcomes the coil B' and moves the bridge piece D' into engagement with the fixed contacts $a'$, $a''$, $a'''$ and also effecting the closure of the contacts $d'$. It should be noticed that a circuit may be traced from phase wire 16 to the terminals $o$, $d$ and $g$, through wires 30 and 31, coil B', wire 32, to the common point 23. But when the fixed contacts $a'$, $a''$ and $a'''$ are connected, the central portion of the resistance R between the terminals $g$, $h$ and $k$, and also the coil B' are short-circuited. Coil A' therefore acts alone to hold its core 35 in its uppermost position, that is, it is not opposed by the coil B'. Upon the closure of the contacts $d'$, the coil A" is placed in parallel with the coil A' and a single-phase current flows through both of said coils. As the motor increases further in speed, the secondary voltage is gradually decreased still further and consequently so also the current through the coil B", until finally the coil A" overcomes the latter and moves the bridge piece D″ into engagement with the contacts b′, b″ and b‴. The circuit through the coil B″ may be traced from the rotor winding 22, through the wire 15, terminal n, wires 25 and 26, coil B″, wire 26′, terminals f, k, to the common point 23. When the contacts b′, b″, b‴ are connected the intermediate portions of the starting resistance as well as the coil B″ are short-circuited and therefore the coil A″ holds the core 36 in its uppermost position without any opposition. When the core 36 is moved upwardly, the contacts d″ are closed to effect the excitation of the coil A‴, and when the motor reaches a predetermined speed the latter coil will overcome coils B‴ and move the bridge piece D‴ into engagement with the contacts c′, c″, c‴ and effect connection of the contacts c″ and the disconnection of the contacts f′. The opening of the contacts f′ will cause the deënergization of the magnets A′, A″, and the closure of the contacts d‴ will form a retaining circuit for the coil A‴. The circuit for the coil B‴ may be traced from the rotor winding, through wire 17, coil B‴, wire 17′, terminals m, e and h, to the common point 23. When the last switch is closed, the remainder of the resistance between the terminals o, m and n, and also the coil B‴ will be short-circuited, leaving the coil A‴ to act alone to hold its switch closed. It will be seen that with this arrangement there is less consumption of current, for the reason that after the motor attains full speed, the only coil taking current is that designated A‴. Furthermore, the coils B′, B″, B‴ are short-circuited, thus reducing the resistance in the rotor circuit to a minimum.

In Fig. 3, the coils B′, B″ and B‴ are so connected that they will be in shunt to portions of the starting resistance or across three of the phases of the rotor winding. For instance, the coil B′ is connected between the points g and h, through the wires 44 and 41. The coil B′, however, is connected directly to the contacts a′, a″, through the wires 43 and 42, respectively, so that when the first switch is closed it immediately short-circuits the coil B′ through the contacts a′, a″ and bridge piece D. The sectional resistance between the terminals g, h and k is short-circuited in an obvious manner. The coil B″ is connected through the wires 52, 51, 50, and 49 between the points d and f, this being between different phases. When the second switch is operated, the resistance between the terminals d, e and f is short-circuited and the coil B″ is short-circuited directly through the contacts b′, b‴ and the contact-maker D″. The coil B‴ is connected between the terminals n and m which are connected to the third set of phases of the rotor. This coil is connected between the terminals n and m, through wires 54, 55, 56 and 57. Upon the closure of the third switch, the coil B‴ and the rest of the starting resistance will be short-circuited and the contacts d‴ closed and the contacts f′ opened to effect the opening of the first two switches and leaving the coil A‴ to hold the third switch closed.

It will be seen that in Fig. 2, coils B′, B″ and B‴ are connected in series with portions of the starting resistance, while in Fig. 3 they are connected in shunt thereto. In either case, however, they are so connected that the current will be approximately equally divided to excite said coils and effect an operation of the switches in the desired manner.

As in Fig. 1, so also in Figs. 2 and 3 the apparatus is adapted to wide ranges of voltages. The strength of the various solenoids varies directly as the current flow therethrough, and the current varies directly as the voltages applied to said coils, so that any drop in the voltage applied would cause said coils to weaken and exert less force on their cores.

Although I have herein shown modified forms of my invention, it is obvious that those skilled in the art could make various changes in the details and arrangement of parts without departing from the spirit and scope of my invention. I therefore wish it to be understood that I do not desire to be limited to the exact construction herein disclosed.

What I claim and desire to have protected by Letters Patent of the United States is:

1. The combination with an alternating-current motor of the induction type, of coils connected to the primary source of current, additional coils connected in series with the secondary of the motor and differentially opposing said first-named coils, resistance in series with said additional coils in the secondary circuit, and means controlled by said coils for short-circuiting said resistance.

2. The combination with a multi-phase motor of the induction type, of coils connected in parallel to the primary source of current, additional coils connected in series with the secondary of the motor, resistance connected in series in the secondary circuit, and in series with said additional coils and means controlled by the differential action of said coils for short-circuiting said resistance.

3. The combination with a multiphase motor of the induction type, of coils connected in a circuit leading from the primary source of current, resistance in the secondary circuit of the motor, additional coils in a circuit connected between one terminal of the secondary and one terminal of said resistance and arranged to oppose said first-named coils, and means for short-circuiting said resistance, said means being differentially acted upon positively by the first and second named coils, respectively.

4. The combination with an alternating current motor of the induction type, of resistance in the secondary circuit thereof, and a plurality of electro-responsive devices for successively short-circuiting said resistance as the motor increases in speed, said electro-responsive devices comprising single-phase coils connected to the primary, and additional single phase coils in a circuit connected between said resistance and the rotor secondary and arranged to oppose said first-named coils.

5. The combination with an alternating-current motor of the induction type, of resistances in the secondary circuit thereof, a plurality of electro-magnetic devices for successively short-circuiting said resistances as the motor increases in speed, said electromagnetic devices comprising coils connected in parallel to the primary, additional coils opposing said first named coils and connected in series to the secondary, and a switch operated by the last-acting electromagnetic device to effect the restoration to normal of the first-acting electromagnetic devices.

6. The combination with an alternating current motor, of an opposition element connected in the rotor circuit of said motor, electro-responsive devices for controlling said opposition element, a magnet winding for each of said electro-responsive devices connected directly to the source of current supply, and additional magnet windings arranged to act in opposition to said first named windings and connected in said rotor circuit between said opposition element, and the rotor whereby the latter is controlled to vary the speed of the motor.

7. The combination with an alternating current motor, of electro-receptive devices connected directly to the source of current supply, an opposite element, additional electro-receptive devices connected in series relation only with said opposition element, and means operated by the differential action of said electro-receptive devices for controlling said opposition element to accelerate the speed of the motor.

8. The combination with an alternating current motor, of the induction type, of solenoids connected to the primary, resistances connected to the secondary, additional solenoids connected in series with one phase of the secondary and differentially opposing said first named solenoids, and means operated by said solenoids to gradually short circuit said resistance.

9. The combination with an electric motor, of one or more coils connected to the source of supply, an opposition element connected to the rotating part of the motor, one or more additional coils in a circuit connection between the said rotating part and said opposition element and acting in opposition to the first named coils, and means operated by said coils to successively render ineffective portions of said opposition element.

10. The combination with an induction motor, of a series of coils connected to the primary, a sectional starting resistance connected to the rotor, an additional series of coils arranged to oppose the first-named series of coils and in a circuit connection between the secondary and said sectional resistance, means operated by said coils to short circuit said resistance gradually, and means co-acting with said operating means for effecting the successive energization of said first-named coils.

11. The combination with an induction motor, of a solenoid connected in a single phase circuit across two of the mains, one or more additional solenoids connected in open circuit in parallel with said first-named solenoid, a sectional starting resistance connected to the rotor, opposition solenoids connected in series with said resistance, switch devices operated by said solenoids to successively short circuit said starting resistance, additional switches co-acting with certain of said switch devices to effect a successive energization of said additional solenoids, and a switch co-acting with the last switch device to cut out all solenoids connected to the mains except the last one.

In testimony whereof, I have signed my name to this specification in the presence of two subscribing witnesses.

DAVID L. LINDQUIST.

Witnesses:
CAMPBELL SCOTT,
CHARLES M. NISSEN.